Oct. 29, 1940.  T. W. SUKUMLYN  2,219,405
ELECTROMAGNETIC LENS
Original Filed Aug. 20, 1938
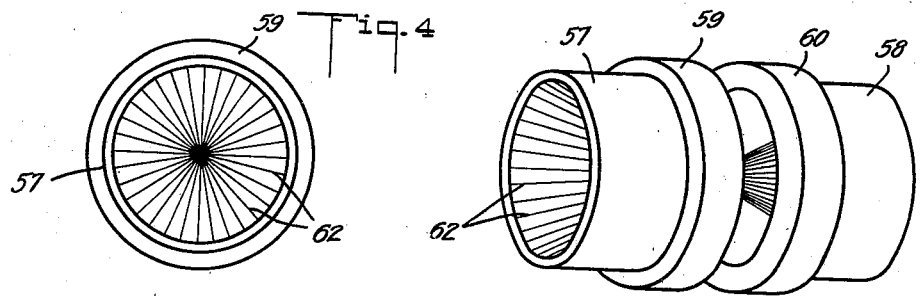
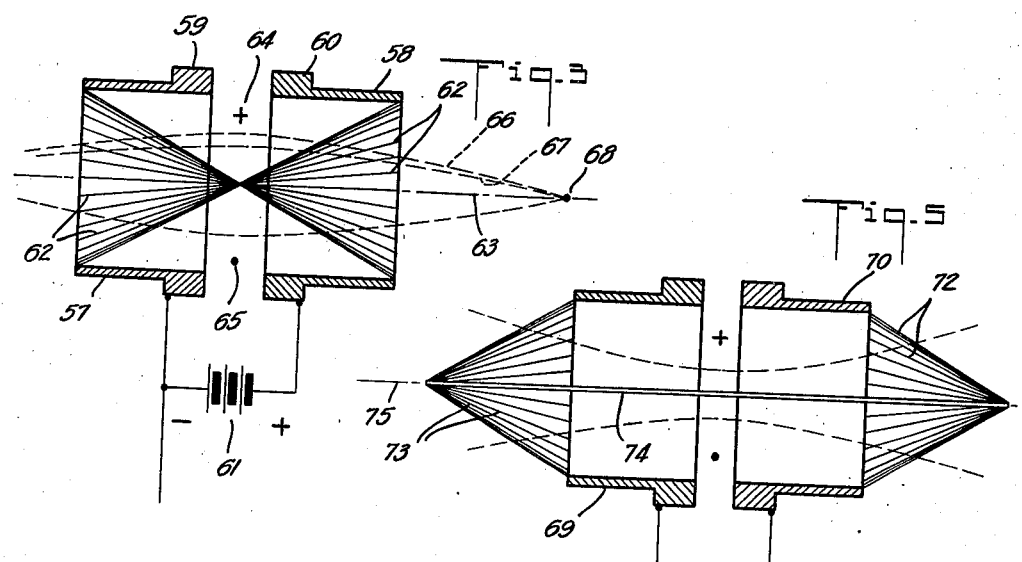
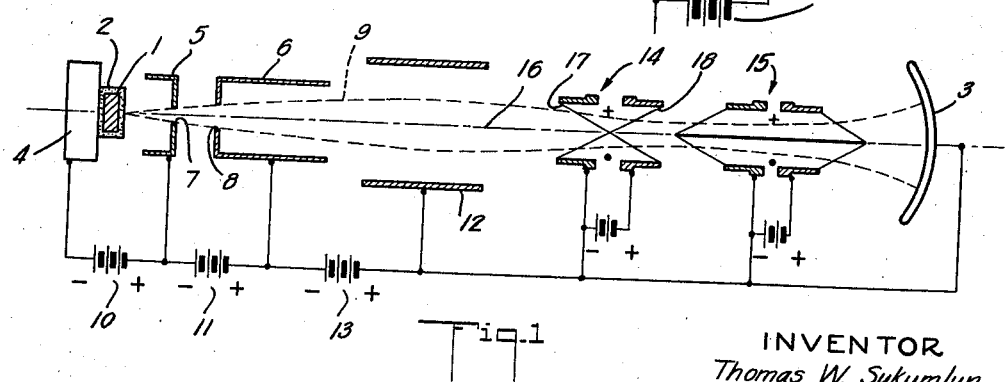
INVENTOR
Thomas W. Sukumlyn
BY John Flann
ATTORNEY Patented Oct. 29, 1940

2,219,405

UNITED STATES PATENT OFFICE 2,219,405

ELECTROMAGNETIC LENS

Thomas W. Sukumlyn, Los Angeles, Calif.

Original application August 20, 1938, Serial No. 225,958. Divided and this application April 17 1939, Serial No. 268,263

8 Claims. (Cl. 250—161)

This invention relates to a system for magnifying images.

This application is a division of an application filed in the name of Thomas W. Sukumlyn on August 20, 1938, Serial No. 225,958, and entitled "Electron microscope system."

The basis of magnification of this character is the use of an optical lens system, for refracting light emanating from points of the object, in such a way as to focus diverging rays to build up an enlarged image. It is well-known, however, that it is not possible to magnify the image indefinitely. There are inherent limits to the degree of magnification by optics. One of the limiting factors is the wave length of the light utilized for the illumination. It may be proved, for example, that with visible light, two points on an object to be magnified can be no closer than .00001 inch in order to appear as separate points of the enlarged image. The shorter the wave length in general, the smaller may be this point separation and yet yield separate points on the enlarged image.

It is one of the objects of this invention to obviate these limitations, and particularly by the utilization of suitable radiant energy of some form other than visible light.

Radiant energy for this purpose may be that provided by electronic emission. A magnified image, corresponding to the object to be enlarged, may be formed by the electrons on a fluorescent screen; or alternatively the electrons may affect a sensitive photographic surface. The stream of electrons is controlled to delineate the image; and for this purpose use is made of devices intended to bend the electron rays in a manner analogous to the refraction of visible light by an optical system.

It is another object of this invention to provide devices of this character, which may be aptly termed electron ray lenses.

The simplest manner of practicing the invention is by rendering the object electron emissive, as by coating it with a photosensitive material and exposing it to actinic radiations. However, other ways of affecting electron beams to delineate the object may be substituted; for example, by interposing the object in the path of such a beam. It is another object of this invention to make it possible to transmit a beam of electrons to affect a suitable screen and to form thereon an enlarged or magnified image of an object cooperating with the beam.

This invention possesses many other advantages, and has other objects which may be made more easily apparent from a consideration of several embodiments of the present invention. For this purpose there are shown a few forms in the drawing accompanying and forming part of the present specification. These forms, which illustrate the general principles of my invention, will now be described in detail; but it is to be understood that this detailed description is not to be taken in a limiting sense, since the scope of my invention is best defined by the appended claims.

Referring to the drawing:

Figure 1 is a diagram, illustrating a system embodying my invention;

Fig. 2 is a pictorial view of one of the electron ray lenses;

Fig. 3 is a diagram illustrating the function of the electron ray lens illustrated in Fig. 2, and also showing the lens in longitudinal section;

Fig. 4 is an end view of the electron ray lens illustrated in Fig. 2, and

Fig. 5 is a view similar to Fig. 3 of a form of electron ray lens in which the electron ray diverges in passing through the lens instead of converging as in the form illustrated in Figs. 2, 3 and 4.

In Figure 1, a conventionally shaped object 1 is illustrated as the object of which it is desired to form an image by the aid of electronic emission. As an example of one way in which this electronic image may be formed, object 1 may be made inherently emissive in any suitable manner. For example, the object 1 may be coated on its front surface with a layer 2 of radio-active material. Such a coating may be obtained in any well known manner, such for example as exposing the object 1 to radio-active material or to radium emanation. Electrons are liberated from the coating 2 and finally the beam of electrons corresponding to the object 1 is focused to an image; in this instance, on a screen 3. This screen 3 may be fluorescent in order to produce immediately a visible image, or else a photo-sensitive layer may be provided to be affected actinically.

The forming or focusing of the image involves the use of refracting devices intervening between the object 1 and the screen 3. The object 1 is disposed in conducting relation to a conducting support 4. A pair of annular or tubular devices 5 and 6 are next placed in the path of the electron stream. These devices 5 and 6 are provided with apertures 7 and 8 respectively for confining the electron beam 9 emanating from object 1 in a comparatively narrow path. For this purpose the members 5 and 6 are maintained at a potential positive with respect to the object 1 as by the aid of the batteries 10 and 11. These devices 5 and 6 may be termed electro-optical lenses for acting upon the electrons to confine them into a small bundle.

The electron beam 9 conforming to the object 1 is next acted upon by accelerating anode 12. This accelerating anode 12 is maintained at a positive potential with respect to object 1 by the aid of the additional battery 13.

Located in the path of the beam 9 as it emerges from the directing or accelerating anode 12 are a pair of electron ray lenses 14 and 15, forming a ray refracting system. These are substantially analogous to refracting optical lenses. Thus lens 14 is the equivalent of a convex or converging lens structure, while lens 15 is the equivalent of a concave or diverging lens structure for the beam 9. The specific structure of these two lenses will be described presently. For the moment it is sufficient to note that each of these lenses is in the form of a series of conductors arranged to provide magnetic fields through which the beam 9 must travel to reach screen 3. Thus lens 14 forms a magnetic field annularly disposed around the axis 16 of the lens. This annular field in this instance is shown as having increasing length as the radius increases from the axis 16. This is represented by the triangular section bounded by the crossing lines 17 and 18, the crossing occurring on the axis 16.

Accordingly, the rays comprising the electron beam 9 are deflected more and more as they depart from the axis 16. This deflection occurs due to the well-known action of a magnetic field upon electrons. In other words, this magnetic field serves in a manner analogous to a converging optical lens in its operation upon the electron beam 9.

Analogously, the electron ray lens 15 is arranged in reverse manner; that is, the length of the annular magnetic field is a maximum along the axis 16 and its length decreases as the radius increases from this axis. Thus the electron beam 9 is diverged by this lens structure 15.

By appropriate positioning and design of the lenses 14 and 15, they form a proper refracting system. The action upon the beam 9 is that the beam is focused to cause an image to be visible on the screen 3, either by fluorescence or by development of the photo-sensitive surface.

As illustrated, the screen 3 is maintained at a potential positive with respect to the object 1 in order that the electrons may be attracted thereon. Also, the structures 14 and 15 may be connected to the system so as to be maintained at a positive potential.

It will be understood that all of the apparatus is to be inclosed in an appropriate, evacuated vessel.

The electron ray lenses are shown in detail in Figs. 2 to 5 inclusive. In the structure illustrated in Figs. 2, 3 and 4, the effect of the electron ray lense is to converge rays of electrons. For this purpose use is made of a pair of terminal collars 57 and 58 placed coaxially with respect to a lens axis 63. Each of these terminal collars may carry enlarged flanges such as 59 and 60 connected to opposite poles of a battery 61 or other source of electrical energy. These flanges 59 and 60 ensure that there be no appreciable variation in the resistance through the various conducting paths now to be described. These conducting paths are formed of conducting elements such as 62 forming virtually elements of a double cone, the bases of which are oppositely directed and the apices of which fall upon the axis 63. It is seen that current flows from battery 61 first of all to the terminal collar 58; thence from the base of one cone element through all of the conductors 62 in parallel, and finally to the base of the left hand cone, into the terminal collar 57, and to the negative side of the battery 61. The resultant magnetic field is such that in the annular area between the internal surfaces of collars 57, 58 and the equivalent cone surfaces, there is a strong magnetic field directed downwardly in the upper part of the figure as indicated by the cross 64, and upwardly as indicated by the dot 65. The magnetic field is confined to the space between cylinder and cone and is everywhere perpendicular to the axis.

Assuming that there are two electron rays 66 and 67 emerging from a common point on an object, these rays are bent downwardly and inwardly toward the axis to be focused at a common point 68. The ray 66 which is farther from the axis 63 than the ray 67 is refracted to a greater extent because it travels through a longer magnetic field.

A refracting lens structure for diverging the electron ray is illustrated in Fig. 5. In this case the terminal collars 69 and 70 are fed from a battery 71. The conductors 72 form virtually the elements of a cone, and are attached at the base of the cone to the outer edge of the terminal collar 70. A similar set of conductors 73 is arranged in connection with the terminal collar 69. The two sets of conductors 72 and 73 are connected by conductor 74. The axes of the cones coincide with the axis 75 of the lens structure.

In this case the annular magnetic field resulting from the current flowing through conductors 72 and 73 has a diminishing width. The section of the annulus is defined by the elements of the enveloping cones and by the internal surfaces of the collars 69 and 70. Accordingly the farther away an electron ray is from the axis 75, the shorter its path through the magnetic field. The resultant effect is to diverge the rays.

It is not necessary that the conductors 62 or 72 be straight, as shown. They may be appropriately curved to cause the amount or extent of refraction to differ in a desired manner from that produced by a straight conductor. In this case, the envelope of the conductors will be defined by a surface of revolution about the axis 63 or 74, other than the surface of a cone.

It is clear that by appropriate design and appropriate location of one or more electron ray lenses such as now described, the electron rays may be treated in substantially the same manner as light rays by optical refracting systems.

By appropriate choice of current polarities flowing in the elemental conductors 62, the lens of Fig. 3 may be converted to a divergent lens; and similarly, appropriate changes in the connections to and from the cones and rings of Fig. 5, this lens may be made converging.

What is claimed is:

1. An electromagnetic lens for magnetically deflecting rays of electrons, said lens having a longitudinal axis, as well as a plurality of conductors arranged around the axis, and a source of direct current for the conductors, said conductors having a direction oblique to the axis and converging toward a common point on the axis, and connected across the source for passing current through the conductors, to form an annular magnetic field about the axis, the width of the field in the direction of the axis being non-uniform, whereby the length of the path of a ray of electrons through the annular field is a function of the displacement of the ray from the lens axis.

2. An electromagnetic lens for magnetically deflecting rays of electrons, said lens having a longitudinal axis, as well as a plurality of conductors forming converging elements of a cone having its apex on the axis, and a source of direct current for passing current through the conductors in a uniform direction toward or from the cone apex.

3. An electromagnetic lens for magnetically deflecting rays of electrons, said lens having a longitudinal axis, as well as a plurality of conductors forming elements of a double cone, the apex of the cone falling on the lens axis, and a source of direct current for passing current through the conductors in a uniform direction between the bases of the cone.

4. An electromagnetic lens for magnetically deflecting rays of electrons, said lens having a longitudinal axis, as well as a plurality of conductors forming elements of a double cone, the apex of the cone falling on the lens axis, conducting rings forming the bases of the cones to which the respective ends of the conductors are electrically connected, and a source of direct current having its opposite terminals respectively connected to said rings.

5. An electromagnetic lens for magnetically deflecting rays of electrons, said lens having a longitudinal axis, comprising a pair of conducting rings coaxial with said axis, a pair of series of conductors, respectively electrically connected to the rings, each of the pair of series forming the elements of a cone with its apex falling on the axis, the apices of the cones being oppositely directed, an electrical connection between the apices, and a source of direct current having its opposite terminals connected respectively to the said rings.

6. An electromagnetic lens for magnetically deflecting rays of electrons, said lens having a longitudinal axis, comprising a plurality of conductors oblique to the axis, and arranged in parallel electrical relation, the envelope of said conductors being defined by a surface of revolution about the axis, and a source of direct current for passing current in parallel to all of the conductors.

7. An electromagnetic lens for magnetically deflecting rays of electrons, said lens having a longitudinal axis, comprising a pair of conducting rings spaced along the axis and coaxial therewith, a plurality of conductors electrically joined respectively at their ends to said rings, and intersecting the axis, the envelope of the conductors being defined by a surface of revolution about the axis, and a source of direct current having its terminals connected to the rings.

8. An electromagnetic lens for magnetically deflecting rays of electrons, said lens having a longitudinal axis, comprising a series of conductors and a source of direct current for the conductors, said conductors being connected across the source for passing current through the conductors, and being so placed that there is a resultant magnetic field of annular form coaxial with the axis, the width of the annular field along a path direction parallel to the axis being a function of the distance of the path from the axis.

THOMAS W. SUKUMLYN.